United States Patent [19]

Joseph

[11] Patent Number: 4,700,970
[45] Date of Patent: Oct. 20, 1987

[54] SUSPENSION ELEMENT FOR A HEAVY VEHICLE

[75] Inventor: Philippe Joseph, Carpentras, France

[73] Assignee: S.A.M.M. - Societe d'Applications de Machines Motrices, Bievres, France

[21] Appl. No.: 847,383

[22] Filed: Apr. 2, 1986

[30] Foreign Application Priority Data

Apr. 3, 1985 [FR] France ................................ 85 05067

[51] Int. Cl.⁴ ............................................. B60G 11/30
[52] U.S. Cl. .................................... 280/705; 267/256; 280/708; 280/714
[58] Field of Search ............... 280/705, 702, 708, 714; 267/15 A

[56] References Cited

U.S. PATENT DOCUMENTS

| | | | |
|---|---|---|---|
| 3,444,787 | 5/1969 | Gies et al. | 91/462 |
| 3,602,470 | 8/1971 | Reynolds | 280/705 |
| 3,614,125 | 10/1971 | Sinclair et al. | 280/705 |
| 4,156,536 | 5/1979 | Brandstadter | 280/705 |

OTHER PUBLICATIONS

*Machine Design,* vol. 55, No. 15, Jun. 30, 1983, pp. 127, 128, "Mechanical Drives Reference Issue".
*Product Engineering,* vol. 47, No. 6, Jun. 1976, pp. 33-36, "Plastic-Base Bearings Make Designing Easier".

*Primary Examiner*—John J. Love
*Assistant Examiner*—Kenneth R. Rice
*Attorney, Agent, or Firm*—Sughrue, Mion, Zinn, Macpeak, and Seas

[57] ABSTRACT

The suspension element comprises an arm (1) through which extends a wheel stub-axle (2) of the vehicle which is rotatively mounted on a fixed part (3) integral with the chassis of the vehicle with interposition of bearing means between the fixed part (3) and the arm (1), a hydraulic chamber (5) being provided in the arm (1) and containing a slidable piston (7) on which is pivotally mounted a link (8) whose end opposed to the piston (7) is pivotally mounted on the fixed part (3). The bearing means comprise a bearing bush (23) surrounding the fixed part (3) and internally coated with a material for a high resistance dry sliding, the bush (23) being apertured for allowing the arm (1) to oscillate on each side of a lug (13) of the fixed part (3) which radially projects from the bush (23) and is pivotally mounted on the link (8).

16 Claims, 8 Drawing Figures

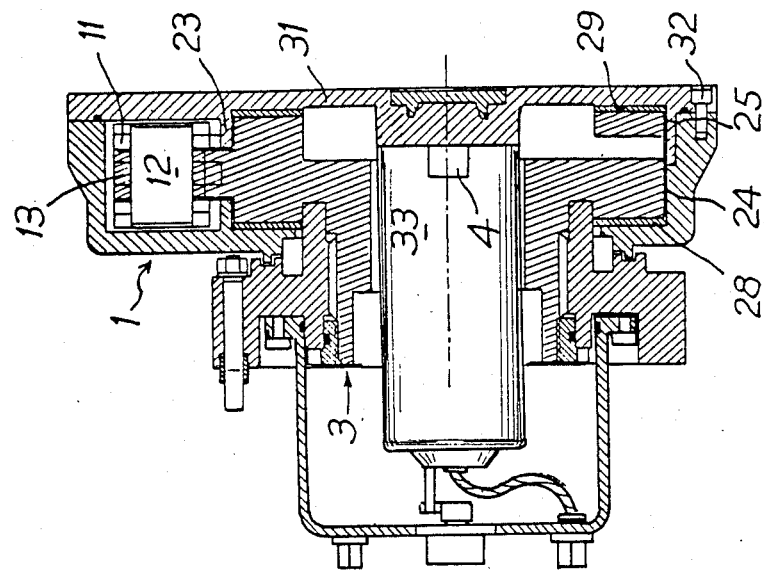
FIG.2
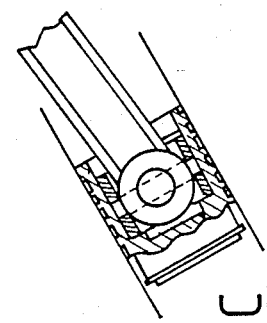
FIG.1A
FIG.1B
FIG.1C

SUSPENSION ELEMENT FOR A HEAVY VEHICLE

The present invention relates to a suspension element for a heavy vehicle, of the type comprising an arm through which extends a wheel stub-axle of the vehicle which is rotatively mounted on a fixed part integral with the chassis of the vehicle with interposition of bearing means between this fixed part and the rotary arm, a hydraulic chamber being formed in the arm and containing a slidable piston on which is pivotally mounted a link whose end opposed to the piston is pivotally mounted on the fixed part.

In known suspension elements of this type for heavy vehicles, the bearing means are ball bearings which undergo rapid wear produced by the succession of small vibrations or oscillations of the suspension arm, particularly when the vehicle travels over uneven ground. Indeed, very great torsional and bending forces are exerted by the wheel on the balls and in particular lateral rubbing forces which cause the balls to vibrate and may cause their cages to jump, which puts the suspension element out of action.

Further, the ends of the link are usually pivotally mounted by means of ball joints of large size so as to resist very great forces and therefore have a large size which is added to the size of the ball bearing.

Another drawback is also found in the known suspension elements of this type: the drawing of the oil driven by the successive oscillations of the arm and the consecutive to-and-fro movements of the piston causes a heating of the oil. Consequently, the diaphragm which conventionally separates the oil from the gas compartment transmits to the gas the heat generated by the drawing of the oil, so that the gas expands and the ground clearance of the vehicle is adversely affected in that it increases. On the other hand, when the oil is cold, at rest, the gas contracts and the piston moves and the ground clearance is also adversely affected and the vehicle is lowered.

An object of the invention is to overcome these drawbacks.

The invention therefore provides bearing means comprising a bearing bush surrounding the fixed part and provided internally with a material for a high resistance dry sliding, this bearing bush being apertured to allow the arm to oscillate on each side of a lug of the fixed part which projects radially out of the bearing bush and is pivotally connected to the link.

A material for a high resistance dry sliding under heavy loads which is particularly suitable as a covering of this bearing bush is that known under the trademark "PYDANE", this coating being based on fluorocarbonated "TEFLON" PTFE fibres in the form of wires having continuous multifilaments. The bearing bush coated in this way can resist very high loads which may be as much as $400N/mm^2$ while having a considerably reduced overall size as compared to conventional ball bearings.

According to another feature of the invention, which results from the use of a bearing formed by the aforementioned bearing bush, the fixed part has a central cavity adapted to receive complementary means, such as for example a ground clearance corrector for the vehicle. Indeed, the reduction in the overall size of the bearing means liberates this place inside the fixed part for disposing therein elements which would otherwise have to be mounted outside this fixed part and therefore increase the overall size of the suspension element.

According to another embodiment of the invention, in which the link is pivotally mounted on the piston by means of a ball joint or a pin, and on the radial lug of the fixed part by a pin or a ball joint, the ball joint is coated with Stellite, an alloy composed of cobalt and chromium with or without small amounts of additional metals.

The pin may also be coated with Stellite and, as a modification, the ball joint and the pin are coated with Stellite.

The coating of the ball joint and/or pivot pin of the link with Stellite has the advantage of permitting operation under very high pressure of contact, and possibly without lubrication in the housing constituted by the part surrounding the ball joint and the pin.

Further features and advantages of the invention will be apparent from the following description with reference to the accompanying drawings which illustrate two embodiments by way of non-limiting examples. In the drawings:

FIGS. 1A, 1B and 1C are detailed illustrations of the ball joint link and yoke with pin, ball joint link and ball joint yoke, and pin link and ball joint yoke, respectively, of various embodiments of the suspension element according to the invention.

FIG. 2 is a cross-sectional view taken on line II—II of FIG. 1;

Figure 1:
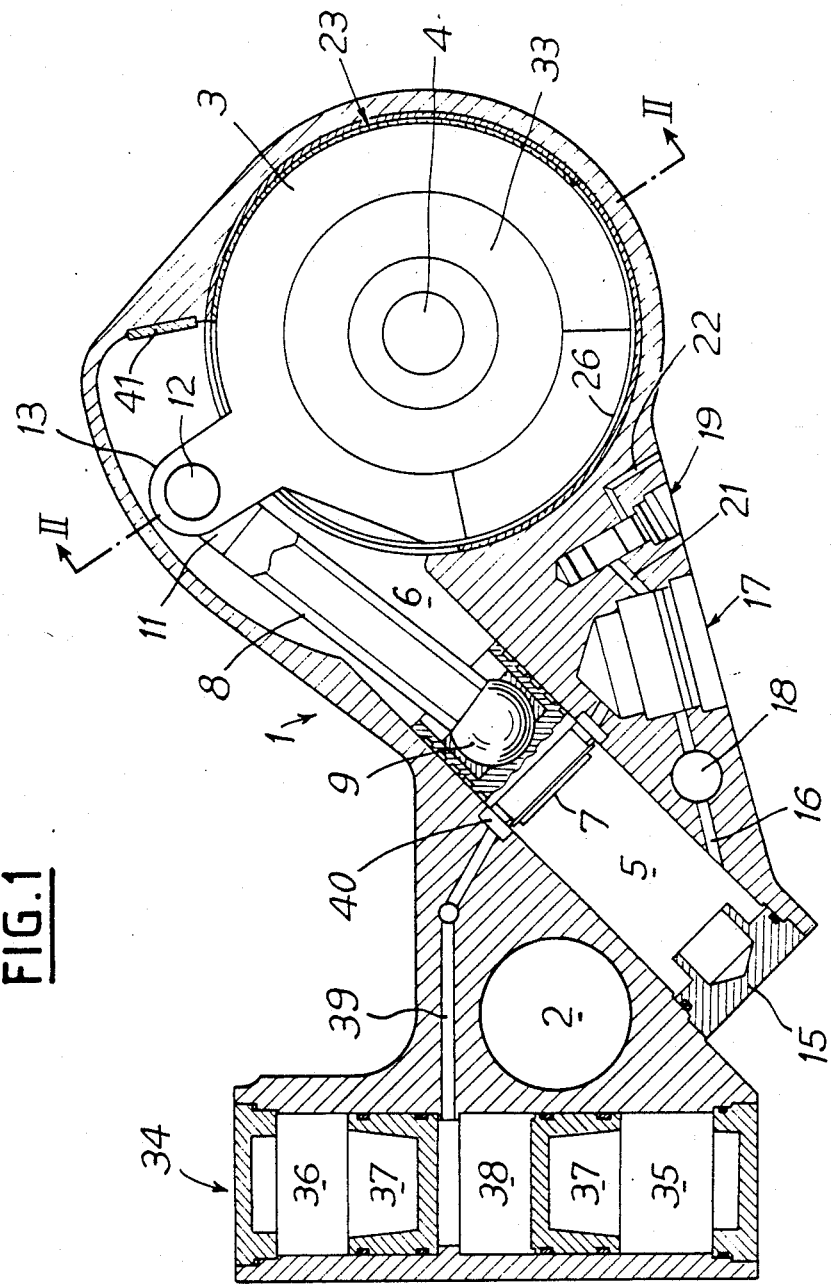
FIG. 1 is a longitudinal sectional view, partly in elevation, of a first embodiment of the suspension element according to the invention.
Figure 3:
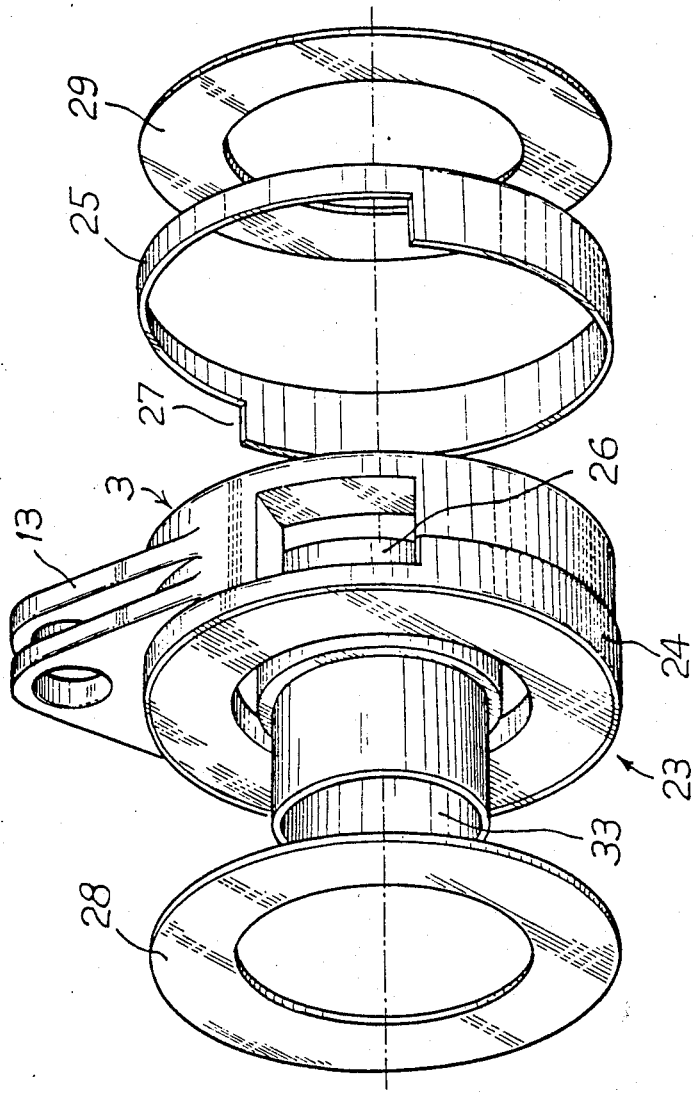
FIG. 3 is an exploded perspective view, to an enlarged scale, of the bearing bush shown in FIG. 1 and of the fixed part on which it is mounted.

The suspension element for a heavy vehicle shown in FIGS. 1 to 3 comprises an arm 1 through which extends a wheel stub-axle 2 of the vehicle (the wheel is not shown in the drawing), and which is rotatively mounted on a fixed part 3 integral with the chassis (not shown) of the vehicle. This fixed part 3 is coaxial with a pin 4 connected to the chassis, bearing means being provided between the rotary arm 1 and the fixed part 3.

A hydraulic chamber 5 is provided in the arm 1 and contains a slidable piston 7 which separates the hydraulic chamber 5 from a cavity 6. Pivotally mounted on the piston 7, which is arranged in the known manner to be slidable in a fluidtight manner in the chamber 5, is a link 8 whose end remote from the piston 7 is pivotally mounted on the fixed part 3. In the presently-described embodiment, the pivotal mounting of the link 8 in the piston 7 is formed by an end ball 9 integral with the link 8 whereas the opposite end of the latter is formed by a yoke 11 pivotally mounted on a pin 12 which is transversely fixed in a lug 13 integral with the fixed part 3 and radially extending from the latter into the cavity 6 of the arm 1 extending the hydraulic chamber 5.

The hydraulic chamber 5 is closed by a sealed plug 15 and fed with fluid by a closed hydraulic circuit which comprises a pipe 16 communicating with the chamber 5 and with a shock absorber 17 of known type comprising for example elastically yieldable washers, which therefore need not be described. The pipe 16 extends through a place 18 for an optional locking valve and the shock absorber 17 communicates with an isolating valve 19 formed in the known manner by a pipe 21. The valve 19 communicates with a pipe 22 and all these elements of a circuit feeding oil to the chamber 5 are provided in the arm 1 and fed by a hydraulic source (not shown).

The piston 7 is advantageously made from bronze in the known manner, and the fixed part 3 is externally cylindrical on each side of the radial lug 13.

According to the invention, the bearing means comprise a generally cylindrical bearing bush 23 which surrounds the fixed part 3 and is provided internally with a material for a high resistance dry sliding, for example the material known under the trademark "PYDANE". The bearing bush 23, shown more particularly in FIG. 3, is apertured so as to permit the arm 1 to oscillate on each side of the radial lug 13 which may consequently occupy successive positions in the cavity 6.

More precisely, the bearing bush 23 is formed by two cylindrical shells 24,25 which are symmetrical to each other relative to a median diametrical plane of the fixed part 3. A circular opening 26,27 is provided in each of the shells in a suitable angular sector and the lug 13 (FIG. 3) extends radially therethrough. Complementarily, the bearing bush 23 includes two corresponding lateral annular abutments 28,29 placed on the sides of the shells 24,25. The latter are therefore in the form of cylindrical portions in which are provided circular cut-away portions 26,27 and are so dimensioned as to be capable of partly surrounding the fixed part 3 when they are mounted on the latter after having been fixed by any suitable known means to the arm 1. The angular cut-away portions 26,27 extend on each side of the lug 13 and allow the arm 1 to oscillate to predetermined extents on each side of the lug 13. In the same way as the shells 24,25, the abutments 28,29 are coated internally, i.e. on the surfaces thereof in contact with the fixed part 3, with a material for a high resistance dry sliding.

The link 8 with its yoke 11 and the abutment 29 are maintained in position by a cover 31 fixed to the arm 1 by bolts such as 32 (FIG. 2).

According to two other features of the invention, the ball joint 9 and/or the pin 12 are coated with Stellite. As a modification, the positions of the ball joint 9 and the pin 12 may be reversed and only one or both of these elements may be coated with Stellite.

Further, the fixed part 3 has an inner chamber 33 concentric with the fixed pin 4, it being possible to provide this chamber owing to the presence of the bearing bush 23 whose size is indeed considerably smaller than that of a conventional ball bearing.

The inner chamber 33 (FIG. 2) may thus receive complementary means of the suspension element, such as for example a corrector for the ground clearance of the vehicle (which is no part of the invention and will therefore not be described here). The chamber 33 therefore enables the overall size of the suspension element to be reduced in that the aforementioned complementary means are not placed outside the fixed part 3, as in prior structures.

According to another feature of the invention, the suspension element is provided with a shock absorber 34 located in the arm 1 and comprising two gas chambers 35,36 separated by two pistons 37,37 which are freely slidable in their respective chamber 35,36 and define therebetween a hydraulic chamber 38 connected to the hydraulic circuit of the suspension element through a pipe 39 arranged in the arm 1. This pipe 39 connects the central chamber 38 to the shock absorber 17.

The suspension element just described operates in the following manner:

During the oscillations of the arm 1 and the stub-axle 2 about the fixed part 3 and the pin 4 resulting from the passage of the wheel associated with this suspension element over the hollows or bumps of the ground, the piston 7 undergoes a reciprocating motion in the hydraulic chamber 5 and the ball joint 9 and the yoke 11 respectively pivot in the piston 7 and about the pin 12, an inner abutment 41 fixed to the arm 1 in its cavity 6 coming to bear against the lug 13 in the lowermost position of the arm 1.

When the stub-axle 2 moves downwardly when passing over a hole, it causes the arm 1 to rotate about the fixed part 3 to which the piston 7 is connected. Consequently, the plug 15 travels away from the piston 7 and this increases the volume of the chamber 5. The oil of the chamber 38, maintained under pressure by the nitrogen chambers 35 and 36, is urged back through the pipe 39 including an annular recess 40 formed around the chamber 5, into the shock absorber 17. Then, the oil drawn by the latter travels through the pipe 16 and enters the chamber 5 so as to compensate for the increase in the volume of the latter.

On the other hand, when the stub-axle 2 rises when passing over a bump, movements opposite to those described hereinbefore take place: the chamber 5 diminishes in volume, the oil is expelled through the pipe 16 to the shock absorber 17, then through the pipe 39 to the chamber 38 which increases in volume and compresses the nitrogen of the chamber 35 and possibly the chamber 36.

In addition to the technical advantages mentioned before, the invention has the following further advantages:

The apertured bearing bush 23 provides the bearing means with a lateral surface on the fixed part 3 which is distinctly larger than the balls of conventional rolling bearings, owing to its lateral abutments 28,29 which enable the lateral forces and the bending moments to be taken.

The Stellite coating of the ball 9 and/or the pin 12 enables the suspension element to operate under a very high pressure of contact of its pivot means and, as the case may be, without greasing.

The presence of the two gas chambers 35,36 permits the obtainment of a stiffness under static load which is acceptable, namely on the order of a Hertz, with a dynamic factor compatible with normal joints (the dynamic factor being the ratio of the maximum forces to the static load, for example 12 tons/3 tons=4).

Another advantage of the two gas chambers 35,36 resides in the fact that they permit the avoidance of a force changing point relative to the travel when the axle moves downwardly.

Figure 4:
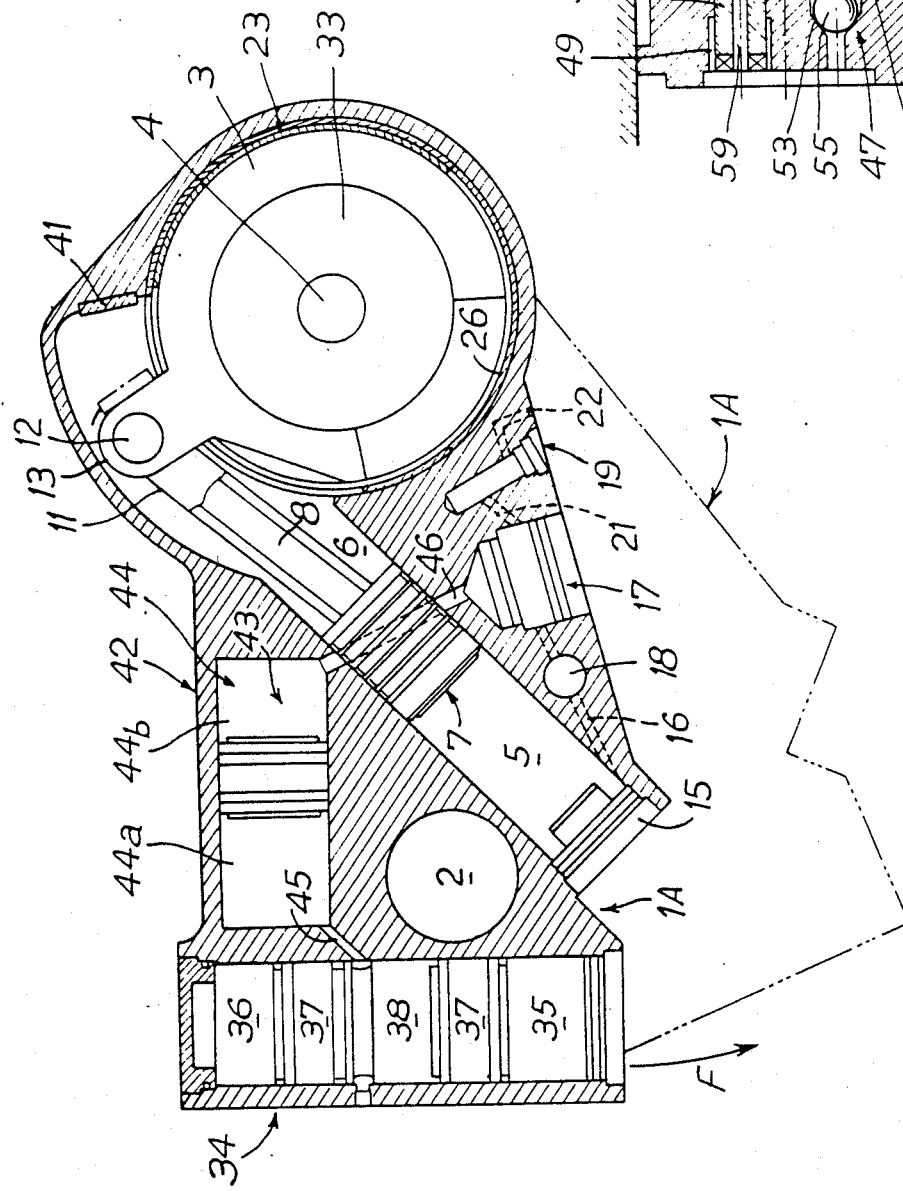
FIG. 4 is a longitudinal sectional view, partly in elevation, similar to FIG. 1 of a second embodiment of the suspension element according to the invention.
Figure 5:
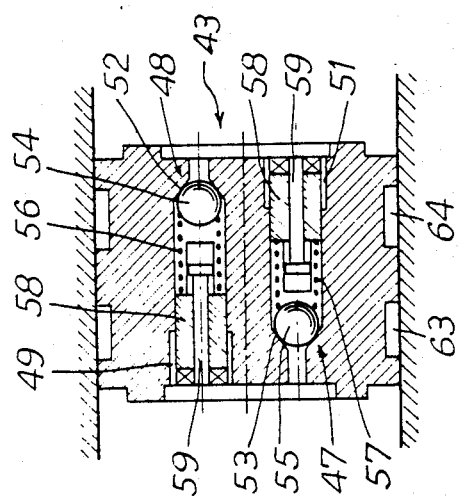
FIG. 5 is a partial sectional view, to an enlarged scale, of a part of the suspension shown in FIG. 4.

A second embodiment of the invention will now be described with reference to FIGS. 4 and 5.

This embodiment differs from the preceding embodiment in that there is added to the suspension element a thermal segregation device 42 outside the hydraulic chamber 5, this device 42 having for function to discharge to the exterior of the chamber 5 the heat given off by the drawing of the oil during the oscillations of the arm 1A.

The segregation device 42 comprises a piston 43 freely slidable in a chamber 44 formed in the arm 1A, for example as in the described embodiment, between the hydraulic chamber 38 and the pipe 46 connected to the shock absorber 17. The piston 43 thus defines two hydraulic compartments 44a, 44b. The compartment 44a comunicates through a pipe 45 with the hydraulic chamber 38, and the other compartment 44b is connected to the shock absorber 17 through a pipe 46. The piston 43 is provided with recentering means adapted to avoid any risk of jamming of the piston, namely, in the described embodiment, two similar valves 47, 48.

Each valve 47, 48 comprises a bore 49, 51 extending longitudinally throughout the body of the piston 43, a seat 52, 53 being provided in each bore 49, 51 for receiving a respective ball 54, 55 which is applied against its seat by a corresponding spring 56, 57 maintained in the bore 49, 51 by a screw 58 provided with a passage 59.

Provided in the periphery of the piston 43 are annular grooves 63, 64 which may receive rings (not shown).

The thermal segregation device 42 operates in the following manner: if the arm 1A rises upon the passage over a bump, the oil is expelled from the chamber 5 to the shock absorber 17 which heats it. This hot oil reaches the chamber 44b through the pipe 46 and urges back the piston 43 which expels the cold oil from the compartment 44a through the pipe 45 into the chamber 38. Consequently, the nitrogen chamber 35, and possibly the chamber 36, are compressed by this cold oil, and the heating of the gas of the chambers 35, 36 is avoided.

If the free piston 43 is offset, owing to internal leakages, and abuts against the end of the chamber 44a or 44b, the corresponding valve 47, 48 opens and allows the passage of the amount of oil required for its recentering.

In a third embodiment, the link is pivotally mounted by a ball joint, as well as on the piston, as on the radial lug 13.

The scope of the invention is not intended to be limited to the described embodiments, since it may encompass many constructional modifications. Thus, in particular, the bearing bush 23 may be constructed in any manner other than that described, and the same is true of the thermal segregation piston 43, inasmuch as the modifications in these elements give equivalent results.

What is claimed is :

1. A suspension element for a heavy vehicle, comprising a fixed part integral with a chassis of the vehicle, an arm rotatively mounted on said fixed part, a wheel stub-axle of the vehicle extending through the arm, bearing means interposed between said fixed part and said rotary arm, a hydraulic chamber provided in the arm, a slidable piston mounted in said chamber, a link pivotally mounted adjacent a first end of the link on the piston, the bearing means comprising a bearing bush surrounding said fixed part and covered internally with a material for a high resistance dry sliding, an aperture in the bush, a lug of said fixed part radially extending from said fixed part, extending through said aperture and pivotally mounted on said link adjacent a second end of said link opposed to said first end thereof, said aperture allowing the arm to oscillate on each side of said lug.

2. A suspension element according to claim 1, wherein said fixed part is cylindrical, said bush comprising two cylindrical shells which are symmetrical to each other relative to a median diametrical plane of said cylindrical fixed part, an aperture provided in each of said shells through which said lug radially extends, and two corresponding lateral annular thrust rings placed on sides of said shells.

3. A suspension element according to claim 1, wherein said link is pivotally mounted on said piston by means of a ball joint and on said radial lug of said fixed part by a pivot pin, the ball of said ball joint being coated with Stellite.

4. A suspension element according to claim 1, wherein said link is pivotally mounted on said piston by means of a pivot pin and on said radial lug of said fixed part by a ball joint, said pivot pin being coated with Stellite.

5. A suspension element according to claim 1, wherein said link is pivotally mounted on said piston by a ball joint and on said radial lug of said fixed part by a pivot pin, said pivot pin being coated with Stellite.

6. A suspension element according to claim 1, wherein said link is pivotally mounted on said piston by a pivot pin and on said radial lug of said fixed part by a ball joint, said ball joint being coated with Stellite.

7. A suspension element according to claim 1, wherein said link is pivotally mounted on said piston by a ball joint and on said radial lug of said fixed part by a pivot pin, said pivot pin and said ball joint being coated with Stellite.

8. A suspension element according to claim 1, wherein said link is pivotally mounted on said piston by a pivot pin and on said radial lug of said fixed part by a ball joint, said ball joint and said pivot pin being coated with Stellite.

9. A suspension element according to claim 1, wherein said rotary arm comprises an elastically yieldable structure comprising two second pistons freely slidably mounted in a sealed manner, two gas chambers separated by said two pistons, said two pistons defining therebetween a hydraulic chamber, the suspension element further comprising a hydraulic circuit connected to feed fluid to said chamber of said slidable piston on which said link is pivotally mounted and to said chamber defined between said two second pistons.

10. A suspension element according to claim 1, wherein said fixed part has a central cavity for receiving a corrector of the ground clearance of the vehicle.

11. An element according to claim 9, comprising a thermal segregation device capable of discharging to the exterior heat given off by the drawing of oil during the oscillations of said rotary arm, said segregation device comprising a second chamber provided in said arm, a third piston freely slidably mounted in said second chamber, said third piston defining in said second chamber two hydraulic compartments communicating with said hydraulic circuit so that one of said compartments defined by said third piston receives oil heated by said drawing while the other of said two compartments defined by said third piston is filled with cool oil.

12. An element according to claim 9, comprising a thermal segregation device capable of discharging to the exterior heat given off by the drawing of oil during the oscillations of said rotary arm, said segregation device comprising a second chamber provided in said arm, a third piston freely slidably mounted in said second chamber, said third piston defining in said second chamber two hydraulic compartments communicating with said hydraulic circuit so that one of said compartments defined by said third piston receives oil heated by said drawing while the other of said two compartments defined by said third piston is filled with cool oil.

13. A suspension element according to claim 11, wherein said thermal segregation piston is combined with piston re-centering means adapted to avoid any risk of a jamming of said segregation piston.

14. A suspension element according to claim 12, wherein said thermal segregation piston is combined with piston re-centering means adapted to avoid any risk of a jamming of said segregation piston.

15. A suspension element according to claim 13, wherein said piston re-centering means comprise two valves each formed by a check-ball elastically biased against a seat in the piston, said two valves allowing the passage of the hydraulic liquid from one compartment to the other when the segregation piston abuts against an abutment in one of said compartments so as to automatically re-centre the segregation piston.

16. A suspension element according to claim 14, wherein said piston re-centering means comprise two valves each formed by a check-ball elastically biased against a seat in the piston, said two valves allowing the passage of the hydraulic liquid from one compartment to the other when the segregation piston abuts against an abutment in one of said compartments so as to automatically re-centre the segregation piston.

* * * * *